(12) United States Patent
Felt et al.

(10) Patent No.: US 8,893,268 B2
(45) Date of Patent: Nov. 18, 2014

(54) PERMISSION RE-DELEGATION PREVENTION

(75) Inventors: Adrienne Porter Felt, Berkeley, CA (US); Helen Jiahe Wang, Redmond, WA (US); Alexander Moshchuk, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 282 days.

(21) Appl. No.: 13/296,252

(22) Filed: Nov. 15, 2011

(65) Prior Publication Data

US 2013/0125210 A1    May 16, 2013

(51) Int. Cl.
| | | |
|---|---|---|
| *G06F 9/54* | (2006.01) | |
| *H04L 29/06* | (2006.01) | |
| *G06F 21/62* | (2013.01) | |
| *G06F 21/60* | (2013.01) | |

(52) U.S. Cl.
CPC ........ *H04L 63/10* (2013.01); *G06F 2221/2119* (2013.01); *G06F 2221/2141* (2013.01); *G06F 21/6218* (2013.01); *G06F 21/604* (2013.01)
USPC ............................. 726/21; 719/313; 719/328

(58) Field of Classification Search
USPC ..................... 719/313, 328; 726/21
See application file for complete search history.

(56) References Cited

U.S. PATENT DOCUMENTS

| | | | |
|---|---|---|---|
| 7,096,491 B2 | 8/2006 | Cheng | |
| 7,203,833 B1 * | 4/2007 | Abadi et al. | ................. 713/167 |
| 2009/0119772 A1 * | 5/2009 | Awad et al. | ..................... 726/21 |
| 2011/0126282 A1 * | 5/2011 | Centonze et al. | ............... 726/21 |
| 2012/0198557 A1 * | 8/2012 | Pistoia et al. | .................. 726/25 |

OTHER PUBLICATIONS

Felt, A.P.; Wang, H.J.; Moshchuk, A.; Hanna, S.; Chin, E., "Permission Re-Delegation: Attacks and Defenses," (Aug. 8-12, 2011), Proceedings of the 20$^{th}$ USENIX Security Symposium, San Francisco, CA [retrieved from http://www.usenix.org/event/sec11/tech/full_papers/Felt.pdf].*

Bugiel, S.; Davi, L.; Dmitrienko, A.; Fischer, T.; Sadeghi, A.R., "XManDroid: A New Android Evolution to Mitigate Privilege Escalation Attacks," (Jun. 30, 2011), Technical Report TR-2011-04, Technische Universitat Darmstadt [retrieved from http://www-infsec.cs.uni-saarland.de/~bugiel/publications/pdfs/XManDroid-tr-2011-04.pdf].*

Felt, A.P.; Chin, E.; Hanna, S.; Song, D.; Wanger, D., "Android Permissions Demystified," (Oct. 17-21, 2011), Proceedings of the 18$^{th}$ ACM Conference on Computer and Communications Security, pp. 627-638 [retrieved from http://dl.acm.org/citation.cfm?id=2046779].*

(Continued)

*Primary Examiner* — Brian W Wathen
(74) *Attorney, Agent, or Firm* — Dan Choi; Sade Fashokun; Micky Minhas

(57) ABSTRACT

Methods and systems for preventing permission re-delegation among applications are disclosed herein. The method includes accepting a message requesting access to a user-controlled resource from a requester application at a deputy application and reducing a first permissions list of the deputy application to a second permissions list. The second permissions list includes an overlap of permissions between the deputy application and the requester application. Moreover, the method also includes sending the message from the deputy application to a computing system via an application programming interface (API), wherein the computing system is configured to reject the message if the second permissions list of the deputy application does not permit access to the user-controlled resource.

19 Claims, 8 Drawing Sheets

(56) References Cited

OTHER PUBLICATIONS

"Volatile", (Nov. 11, 2013) TheFreeDictionary.com [retrieved from http://www.thefreedictionary.com/p/volatile].*
Abadi, M.; Burrows, M; Lampson, B.; Plotkin, G., "A Calculus for Access Control in Distributed Systems," (Sep. 1993), ACM Trans. Program. Lang. Syst. vol. 15, Issue 4, pp. 706-734 [retrieved from http://dl.acm.org/citation.cfm?id=155225].*
Reddy, et al., "Application-centric security policies on unmodified Android", Retrieved at <<http://www.cs.umd.edu/~jfoster/papers/UCLA-TR-110017.pdf>>, Jul. 5, 2011, pp. 10.
Nauman, et al., "Apex: Extending Android Permission Model and Enforcement with User-defined Runtime Constraints", Retrieved at <<http://csrdu.org/pub/nauman/pubs/apex-asiaccs10-long.pdf>>, Proceedings of Computer and Communications Security, 2010, pp. 12.
Berth, et al., "The Security Architecture of the Chromium Browser", Retrieved at <<http://seclab.stanford.edu/websec/chromium/chromium-security-architecture.pdf>>, 2008, pp. 1-10.
Hammer-Lahav, et al., "The OAuth 2.0 Protocol", Retrieved at <<http://tools.ietf.org/pdf/draft-ietf-oauth-v2-10.pdf>>, Jul. 2010, pp. 45.
Das, et al., "PRISM: Platform for Remote Sensing using Smartphones", Retrieved at <<http://research.microsoft.com/pubs/131575/mobi096-das.pdf>>, International Conference on Mobile Systems, Applications and Services, Jun. 15-18, 2010, pp. 14.
Gibler, et al., "AndroidLeaks: Detecting Privacy Leaks in Android Applications", Retrieved at <<http://www.cs.ucdavis.edu/research/tech-reports/2011/CSE-2011-10.pdf>>, Aug. 9, 2011, pp. 1-17.
"Tackling Android Inter-Process Communication and Permissions", Retrieved at <<http://blog.fortify.com/blog/2011/06/14/Tackling-Android-Inter-Process-Communication-and-Permissions>>, Jun. 14, 2011, pp. 4.
Abadi, et al., "Access Control based on Execution History", Retrieved at <<http://www.isoc.org/isoc/conferences/ndss/03/proceedings/papers/7.pdf>>, In Proceedings of the 10th Annual Network and Distributed System Security Symposium, 2003, pp. 15.
Barth, et al., "Robust Defenses for Cross-site Request Forgery", Retrieved at <<http://seclab.stanford.edu/websec/csrf/csrf.pdf>>, Oct. 27-31, 2008, Proceedings of the 15th ACM conference on Computer and communications security, pp. 13.
Barth, et al.,"Cross-origin JavaScript Capability Leaks: Detection, Exploitation, and Defense", Retrieved at <<http://www.usenix.org/events/sec09/tech/full_papers/barth.pdf>>, Proceedings of the 18th conference on USENIX security symposium, 2009, pp. 11.
"Integrity Considerations for Secure Computer Systems", Retrieved at <<http://www.followthemedia.net/unibo/lablinux/docs/Integrity_Considerations.pdf>>, Apr. 1977, pp. 68.
Chen, et al., "An Analysis of Browser Domain-isolation Bugs and a Light-Weight Transparent Defense Mechanism", Retrieved at <<http://citeseerx.ist.psu.edu/viewdoc/download?doi=10.1.1.135.8731&rep=rep1&type=pdf>>, Proceedings of the 14th ACM conference on Computer and communications security, Oct. 29-Nov. 2, 2007, pp. 10.
Chin, et al., "Analyzing Inter-application Communication in Android", Retrieved at <<http://www.eecs.berkeley.edu/~emc/papers/mobi168-chin.pdf>>, Proceedings of the 9th international conference on Mobile systems, applications, and services , Jun. 28-Jul. 1, 2011, pp. 14.
Davi, et al., "Privilege Escalation Attacks on Android", Retrieved at <<http://www.informatik.tu-darmstadt.de/fileadmin/user_upload/Group_TRUST/PubsPDF/DDSW2010_Privilege_Escalation_Attacks_on_Android.pdf>>, Proceedings of the 13th international conference on Information security, 2010, pp. 15.
"Trusted Computer System Evaluation Criteria", Retrieved at <<http://csrc.nist.gov/publications/history/dod85.pdf>>, Department of Defense, Dec. 1985, pp. 1-116.
Dietz, et al., "Quire: Lightweight Provenance for Smart Phone Operating Systems", Retrieved at <<http://secappdev.org/handouts/2011/Dan%20Wallach/quire-tr.pdf>>, In USENIX Security, 2011, pp. 1-14.

Efstathopoulos, et al., "Labels and Event Processes in the Asbestos Operating System", Retrieved at <<http://www.scs.stanford.edu/~dm/home/papers/efstathopoulos:asbestos.pdf>>, Oct. 23-26, 2005, Proceedings of the twentieth ACM symposium on Operating systems principles, pp. 1-14.
Enck, et al., "TaintDroid: An Information-flow Tracking System for Realtime Privacy Monitoring on Smartphone", Retrieved at <<http://appanalysis.org/tdroid10.pdf>>, Proceedings of 9th Symposium on Operating Systems Design and Implementation, 2010, pp. 15.
Enck, et al., "On Lightweight Mobile Phone Application Certification", Retrieved at <<http://www.patrickmcdaniel.org/pubs/ccs09a.pdf>>, Proceedings of the 16th ACM conference on Computer and communications security, Nov. 9-13, 2009, pp. 11.
Ermolinskiy, et al., "Towards Practical Taint Tracking", Retrieved at http://citeseerx.ist.psu.edu/viewdoc/download?doi=10.1.1.167.9996&rep=rep1&type=pdf>>, Jun. 5, 2010, pp. 15.
"DeskClock Service Should Require WAKE LOCK Permission", Retrieved at <<http://code.google.com/p/android/issues/detail?id=14659,>>, Feb. 10, 2011, pp. 2.
MediaPlaybackService should require WAKE LOCK permission. http://code.google.com/p/android/issues/detail?id=14660>>, Feb. 10, 2011, p. 1.
"PhoneApp Receiver can be abused", Retrieved at <<http://code.google.com/p/android/issues/detail?id=14600>>, Feb. 7, 2011, p. 1.
Fournet, et al., "Stack Inspection: Theory and Variants", Retrieved at <<http://www.cs.ucsb.edu/~seclab/projects/jvmstat/papers/stack-inspection-theory-and-variants-popl-02.pdf>>, Journal of ACM Transactions on Programming Languages and Systems, Jan. 16-18, 2002, pp. 12.
Fraser, et al., "LOMAC: Low Water-mark Integrity Protection for COTS Environments", Retrieved at <<http://ieeexplore.ieee.org/stamp/stamp.jsp?tp=&arnumber=848460>>, In IEEE Symposium on Security and Privacy, 2000, pp. 16.
Fuchs, et al., "SCanDroid: Automated Security Certification of Android Applications", Retrieved at <<http://citeseerx.ist.psu.edu/viewdoc/download?doi=10.1.1.148.2511&rep=rep1&type=pdf>>, University of Maryland, 2009, pp. 1-15.
"Android 2.2 Compatibility Definition", Retrieved at <<http://static.googleusercontent.com/external_content/untrusted_dlcp/source.android.com/en/us/compatibility/android-2.2-cdd.pdf>>, 2010, pp. 1-20.
Hardy, Norm, "The Confused Deputy: (Or Why Capabilities might have been Invented)", Retrieved at <<http://www.cse.iitd.ac.in/~sbansal/cs1373/bib/hardy88confused.pdf>>, In ACM SIGPOS Operating Systems Review, vol. 22,1988, pp. 36-38.
"HTML5: Loading Web Pages: Browsing Contexts", Retrieved at <<http://dev.w3.org/html5/spec/browsers.html#windows>>, Nov. 2010, pp. 15.
Krohn, et al., "Information Flow Control for Standard OS Abstractions", Retrieved at <,http://lesniewski.org/~max/docs/flume.pdf>>, Oct. 14-17, 2007, Proceedings of twenty-first ACM SIGOPS symposium on Operating systems principles, pp. 14.
Leopando, Jonathan, "TrendLabs Malware Blog: New Symbian Malware on the Scene", Retrieved at <<http://blog.trendmicro.com/new-symbian-malware-on-the-scene>>, Jun. 2010, pp. 3.
"Content Security Policies", Retrieved at <<https://wiki.mozilla.org/Security/CSP/Specification>>, Retrieved Date: Aug. 18, 2011, pp. 18.
"Window.postMessage", Retrieved at <<https://developer.mozilla.org/en/DOM/window.postMessage>>, Retrieved Date: Aug. 18, 2011, pp. 7.
Myers, et al., "Protecting Privacy using the Decentralized Label Model", Retrieved at <<http://citeseerx.ist.psu.edu/viewdoc/download?doi=10.1.1.126.2197&rep=rep1 &type=pdf>>, ACM Transactions on Software Engineering and Methodology, vol. 9, No. 4, Oct. 2000, pp. 410-442.
Paller, Gabor, "Dedexer", Retrieved at <<http://dedexer.sourceforge.net/>>, Retrieved Date: Aug. 18, 2011, pp. 4.
Popescu, Andrei, "Geolocation API Specification", Retrieved at <<http://dev.w3.org/geo/api/spec-source.html>>, Feb. 10, 2010, pp. 18.

(56) References Cited

OTHER PUBLICATIONS

Ruderman, Jesse, "The Same Origin Policy", Retrieved at <<http://www.mozilla.org/projects/security/components/same-origin.html>>, Retrieved Date: Aug. 18, 2011, pp. 3.

Seriot, Nicolas, "iPhone Privacy", Retrieved at <<http://seriot.ch/resources/talks_papers/iPhonePrivacy.pdf>>, Black Hat DC, 2010, pp. 1-30.

"Device APIs and PolicyWorking Group", Retrieved at <<http://www.w3.org/2009/dap/>>, Retrieved Date: Aug. 19, 2011, pp. 5.

Wallach, et al, "Understanding Java Stack Inspection", Retrieved at <<http://sip.cs.princeton.edu/pub/oakland98.pdf>>, In IEEE Symposium on Security and Privacy, 1998, pp. 1-12.

Wang, et al., "Protection and Communication Abstractions in MashupOS", Retrieved at <<http://homeostasis.scs.carleton.ca/~soma/distos/fall2008/sosp07MashupOS.pdf>>, in ACM Symposium on Operating System Principles, Oct. 14-17, 2007.

Wang, et al., "Convergence of Desktop and Web Applications on a Multi-service OS", Retrieved at <<http://www.usenix.org/event/hotsec09/tech/full_papers/wang.pdf>>, In Usenix Workshop on Hot Topics in Security, 2009, pp. 1-6.

Zeldovich, et al., "Making Information Flow Explicit in HiStar", Retrieved at <<http://www.lasr.cs.ucla.edu/classes/239_1.fall10/papers/p263-zeldovich.pdf>>, Proceedings of 7th USENIX Symposium on Operating Systems Design and Implementation, 2006, pp. 263-278.

Zeller, et al., "Cross-site Request Forgeries: Exploitation and Prevention", Retrieved at <<http://www.cs.kent.edu/~rothstei/spring_09/secprognotes/csrf.pdf>>, 2008, pp. 1-13.

"Projects and Products using ZXing", Retrieved at <<http://code.google.com/p/zxing/wiki/InterestingLinks>>, Retrieved Date: Aug. 18, 2011, pp. 3.

* cited by examiner

PERMISSION RE-DELEGATION PREVENTION

BACKGROUND

Many traditional multi-user operating systems associate privileges with user accounts. When a user installs an application, the application runs in the name of the user and inherits the user's ability to access the system resources. However, modern browsers and device operating systems, such as smartphone operating systems, typically treat applications as mutually untrusting, potentially malicious principals. In most cases, applications are isolated except for explicit inter-process, or inter-application, communication (IPC) channels. In addition, applications are often unprivileged by default and may be granted additional privileges, or permissions, by a user. In other words, permission to use devices and access user-private data through system application programming interfaces (APIs) may be granted to individual applications by the user. Consequently, each application has its own set of permissions, as determined by the user.

Although inter-application communication supports useful collaboration between applications, it also introduces the risk of permission re-delegation. Permission re-delegation occurs when an application with permissions performs a privileged task for an application without permissions. The privileged application may be referred to as a deputy application and may wield authority on behalf of the user. While a permission system may often prevent applications from accessing privileged system APIs without user consent, permission re-delegation may circumvent the permission system and allow an unprivileged application to access such privileged system APIs. This undermines the user's right to approve each application's access to privileged devices and data, leaving such devices and data vulnerable to software bugs and data corruption.

SUMMARY

The following presents a simplified summary of the innovation in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter in a simplified form as a prelude to the more detailed description that is presented later.

An embodiment provides a method for preventing permission re-delegation among applications. The method includes accepting a message requesting access to a user-controlled resource from a requester application at a deputy application and reducing a first permissions list of the deputy application to a second permissions list. The second permissions list includes an overlap of permissions between the deputy application and the requester application. Moreover, the method also includes sending the message from the deputy application to a computing system via an application programming interface (API), wherein the computing system is configured to reject the message if the second permissions list of the deputy application does not permit access to the user-controlled resource.

Another embodiment provides a system for permission re-delegation prevention. The system includes a requester application configured to notify a deputy application of a request to access a user-controlled resource, wherein the requester application includes fewer permissions than the deputy application. The deputy application may be configured to reduce a first list of permissions to produce a second list of permissions, wherein the second list of permissions comprises an overlap of shared permissions between the deputy application and the requester application. Moreover, the deputy application may also be configured to send the request to a computing system via an API. The computing system may be configured to reject the request if the second permissions list does not permit access to the user-controlled resource.

In addition, another embodiment provides one or more non-volatile computer-readable storage media for storing computer readable instructions, the computer-readable instructions providing an inter-application communication (IPC) inspection system when executed by one or more processing devices. The computer-readable instructions include code configured to accept a message requesting access to a user-controlled resource from a requester application at a deputy application. The computer-readable instructions also include code configured to reduce a first permissions list of the deputy application to a second permissions list, wherein the second permissions list includes an intersection of permissions between the deputy application and the requester application. Further, the computer-readable instructions include code configured to send the message from the deputy application to a computing system via a system API, wherein the computing system is configured to reject the message if the second permissions list of the deputy application does not permit access to the user-controlled resource.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The same numbers are used throughout the disclosure and figures to reference like components and features. Numbers in the 100 series refer to features originally found in FIG. 1, numbers in the 200 series refer to features originally found in FIG. 2, numbers in the 300 series refer to features originally found in FIG. 3, and so on.

DETAILED DESCRIPTION

Figure 1:
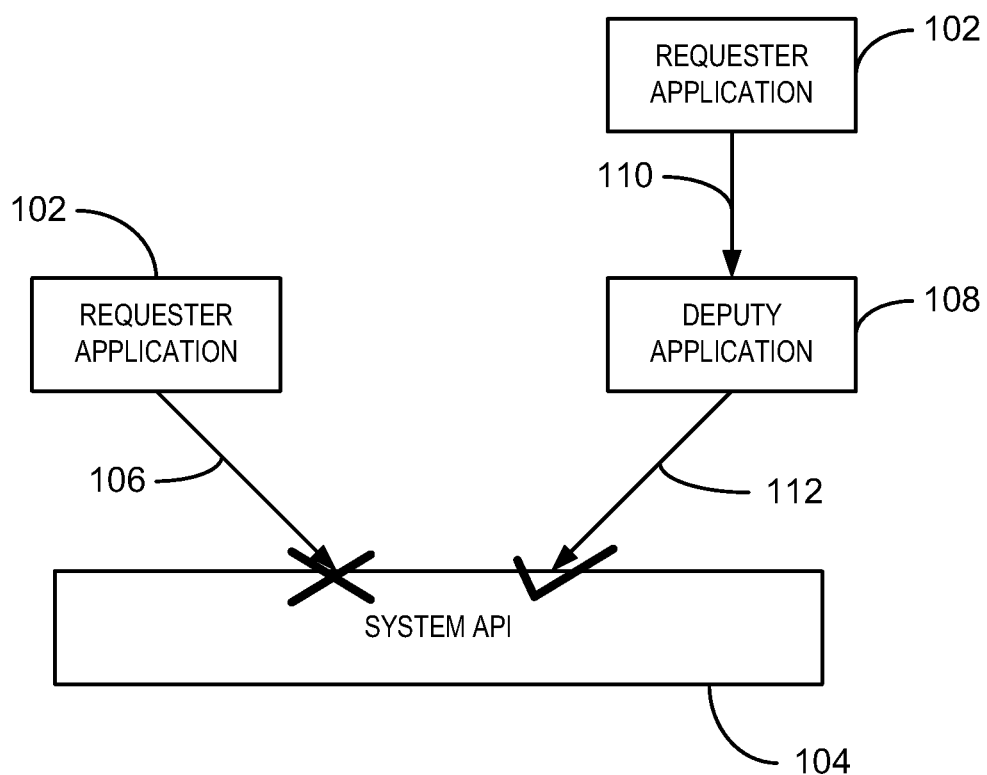
FIG. 1 is a block diagram of an application permissions procedure that is currently used in many browsers and device operating systems.

While an application may be entrusted with a certain degree of permission to access private system resources, the application may never be entrusted with full permission to access all private system resources. Rather, an application's privileges may be set directly by the user. Therefore, a user may delegate a higher degree of permission to a certain application, referred to herein as a "deputy application," while a user may delegate a lesser degree of permission to another application, referred to herein as a "requester application." Thus, the deputy application and the requester application may have disjoint sets of dangerous permissions to access specific user-controlled resources.

As discussed above, permission re-delegation occurs when an application with a permission performs a privileged task on behalf of an application without that permission. This is referred to as a confused deputy attack, or privilege escalation attack. In this scenario, the user delegates authority to a deputy application by granting it a permission. The deputy application defines a public interface that exposes some of the internal functionality of the particular system. A malicious requester application that lacks the permission granted to the deputy application may invoke the deputy application's interface, causing the deputy application to issue a system application programming interface (API) call. The system may approve and execute the deputy application's API call because the deputy application has the appropriate permission. Thus, the requester application has succeeded in causing the execution of an API call that it could not have directly invoked due to a lack of permission.

There are two general scenarios in which permission re-delegation may occur. According to the first scenario, a "confused" deputy application may accidentally expose the internal functionality of the Web browser or the computing device's operating system to less-privilege requester applications. In contrast, according to the second scenario, the developer of the deputy application may intentionally expose the internal functionality of the Web browser or the computing device's operating system to less-privileged requester applications. In both cases, the ability of the particular system to combat permission re-delegation among applications may be compromised.

Embodiments disclosed herein set forth a method and system for permission re-delegation prevention among applications, wherein the applications may include, for example, smartphone applications implemented on a mobile phone or Web applications implemented on a Web site. Such a method and system may prevent applications from performing actions that are not desired by the user. This may protect against attacks on user-controlled resources, which are resources that are guarded by permissions granted by the user. User-controlled resources may include, for example, camera and global positioning system (GPS) devices, as well as private data stores, such as lists of calendars and contacts. Moreover, the system and method disclosed herein may function at an operating system (OS) level, rather than as part of a runtime. This may allow for a more efficient prevention of permission re-delegation among applications, since the system and method may function properly regardless of whether multiple applications operate on different runtimes.

The method and system disclosed herein may prevent permission re-delegation through an inter-process communication (IPC) inspection procedure. The IPC inspection procedure may reduce a deputy application's privileges if the deputy application receives a communication from a less privileged application. Therefore, privilege reduction may reflect the fact that a deputy application is under the influence of a requester application. Consequently, a privileged API call from the deputy application may be denied if any application in the chain of influence lacks the appropriate permissions.

As a preliminary matter, some of the figures describe concepts in the context of one or more structural components, variously referred to as functionality, modules, features, elements, etc. The various components shown in the figures can be implemented in any manner, for example, by software, hardware (e.g., discreet logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discreet logic components, such as application specific integrated circuits (ASICs), and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

The term "logic" encompasses any functionality for performing a task. For instance, each operation illustrated in the flowcharts corresponds to logic for performing that operation. An operation can be performed using, for instance, software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for wireless signals and the like.

FIG. 1 is a block diagram of an application permissions procedure 100 that is currently used in many browsers and device operating systems. According to the application permissions procedure 100, a requester application 102 that lacks permission to access a particular user-controlled resource within a Web browser or device operating system may send a message requesting access to the user-controlled resource to a computing system (not shown) via the system API 104, as indicated by the arrow 106. However, because the requester application lacks permission to access the user-controlled resource, the computing system may deny the requester application's message.

However, the requester application 102 may also attempt to access the user-controlled resource by sending a message to a deputy application 108 that has permission to access the resource, as indicated by the arrow 110. The deputy application 108 may then respond to the message from the requester application 102 by forwarding the message to the computing system via the system API 104, as indicated by the arrow 112. In this case, because the computing system recognizes that the deputy application 108 has permission to access the user-controlled resource, the computing system may grant the deputy application 108 access to the resource via the system API. Moreover, because the requester application 102 is in direct communication with the deputy application 108, the requester application 102 may circumvent the permission system and gain unauthorized access to the user-controlled resource. This significant compromise in the integrity of access to user-controlled resources may be resolved by the IPC inspection procedure disclosed herein, as discussed further with respect to FIG. 2.

Figure 2:
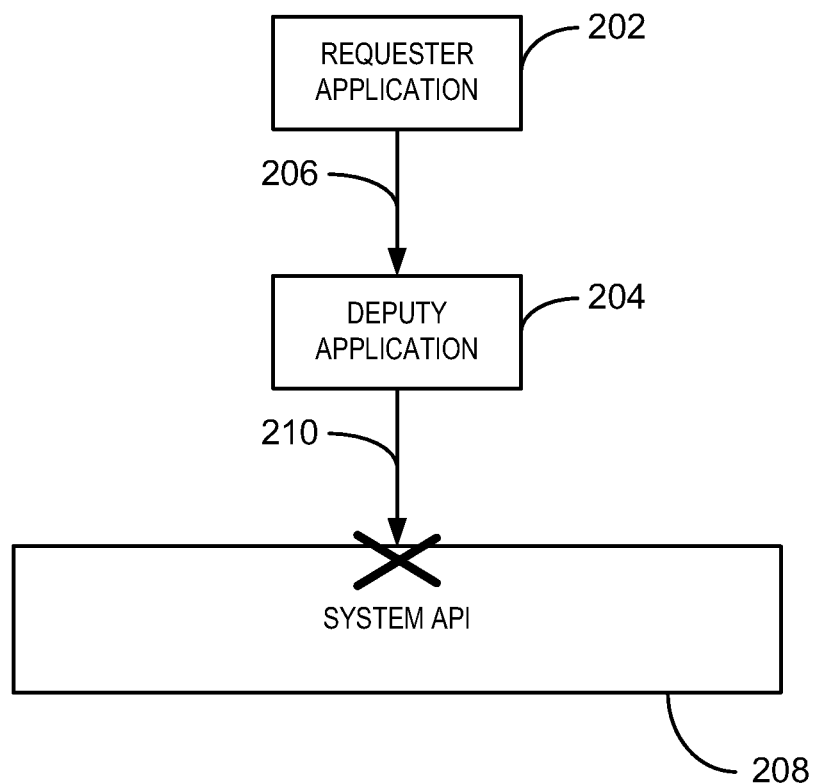
FIG. 2 is a block diagram of an IPC inspection procedure that prevents permission re-delegation among applications.

FIG. 2 is a block diagram of an IPC inspection procedure 200 that prevents permission re-delegation among applications. A requester application 202 may send a message to a deputy application 204, as indicated by the arrow 206, to request access to a user-controlled resource for which the requester application 202 lacks permissions. However, the IPC inspection procedure 200 may prevent permission re-delegation by reducing the permissions, or privileges, of the deputy application 204 to match those of the requester application 202. In other words, the deputy application 204 may temporarily lose any privileges that are not also possessed by the requester application 202. The deputy application 204 may then forward the message received from the requester application 202 to a computing system (not shown) via the system API 208, as indicated by the arrow 210. However, the computing system may deny the deputy application 204 access to the user-controlled resource and, thus, prevent permission re-delegation to the unauthorized requester application 202.

Figure 3:
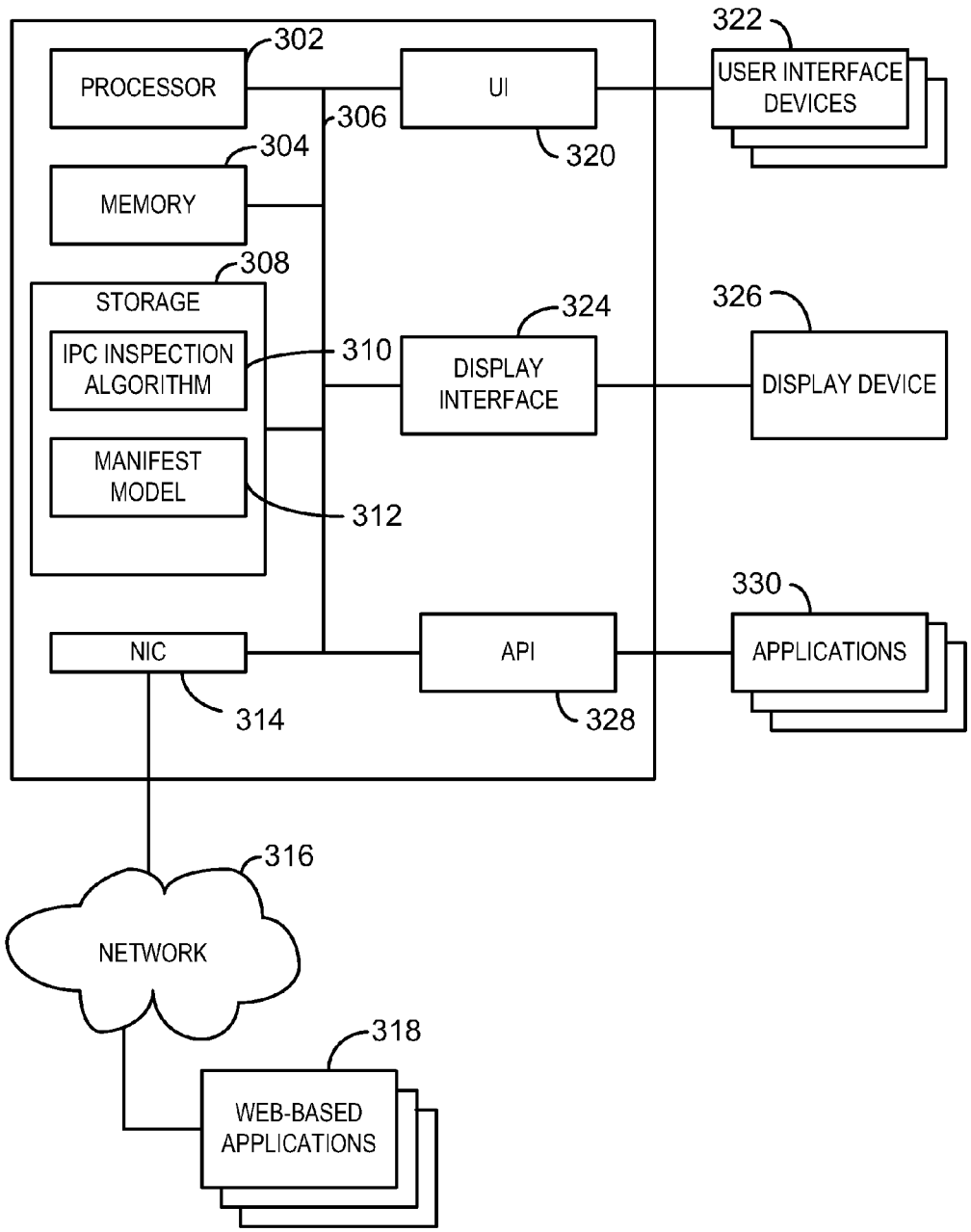
FIG. 3 is a block diagram of an exemplary system that may prevent permission re-delegation among applications by implementing an IPC inspection procedure.

FIG. 3 is a block diagram of an exemplary system 300 that may prevent permission re-delegation among applications by implementing an IPC inspection procedure. In various embodiments, the system 300 may be included within a computing device, such as, for example, a mobile phone, a tablet, a desktop computer, a laptop computer, an electronic reader, a television, or a media player, or any combinations thereof. The system 300 may include a processor 302 that is adapted to execute stored instructions, as well as a memory device 304 that stores instructions that are executable by the processor 302. The processor 302 may be a single core processor, a multi-core processor, a computing cluster, or any number of other configurations. The memory device 304 can include random access memory (RAM), read only memory (ROM), flash memory, or any other suitable memory systems. These instructions implement a method for preventing permission re-delegation among multiple applications through an IPC inspection procedure. The processor 302 may be connected through a bus 306 to one or more input and output devices.

The system 300 may also include a storage device 308 adapted to store an IPC inspection algorithm 310 and a manifest model 312. The IPC inspection algorithm 310 may be used to detect and prevent permission re-delegation, while the manifest model 312 may include information relating to which applications have been granted permissions to access particular user-controlled resources by the user. The storage device 308 can include a hard drive, an optical drive, a thumb-drive, an array of drives, or any combinations thereof. A network interface controller (NIC) 314 may be adapted to connect the system 300 through the bus 306 to a network 316. Through the network 316, Web-based applications 318 may be downloaded and stored within the computer's storage device 308, or may be accessed through a Web browser.

A user interface (UI) 320 within the system 300 may connect the system 300 to any number of user interface devices 322, such as a touchscreen, a speaker, or a pointing device, among others. The system 300 may be linked through the bus 306 to a display interface 324 adapted to connect the system 300 to a display device 326, wherein the display device 326 may include a computer monitor or a display screen of a mobile device, among others. Moreover, the system 300 may also be linked through the bus 306 to an API 328 adapted to connect the system 300 to a number of applications 330. In an embodiment, the applications 330 may be stored within the system 300 and may communicate with each other through the API 328. In another embodiment, the API 328 may be a network interface controller, and the applications 330 may be in communication with the system 300 and with each other through a network linked to the API 328 through the bus 306.

Figure 4:
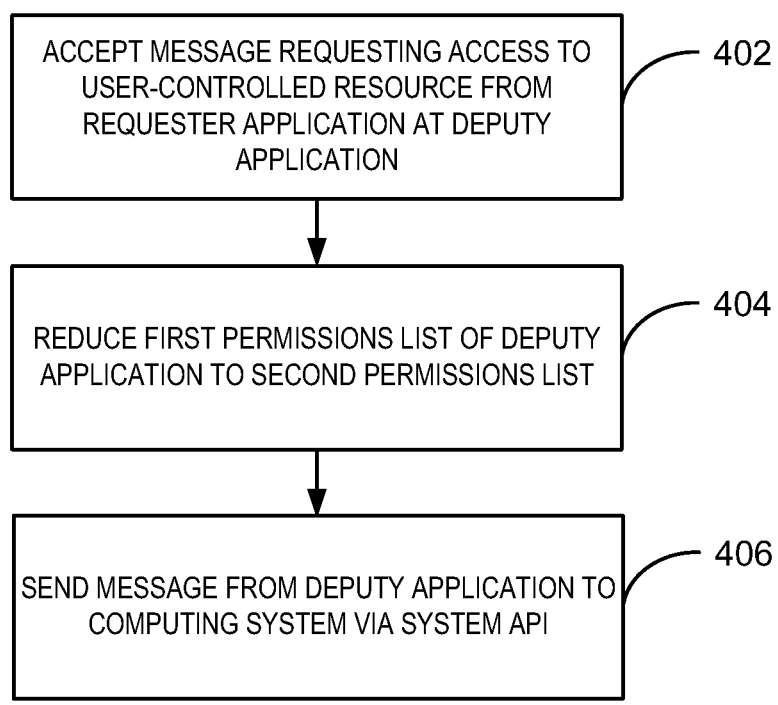
FIG. 4 is a process flow diagram showing a method for preventing permission re-delegation among applications through IPC inspection within a computing system.

FIG. 4 is a process flow diagram showing a method 400 for preventing permission re-delegation among applications through IPC inspection within a computing system. The method begins at block 402 with the acceptance of a message requesting access to a particular user-controlled resource from a requester application at a deputy application. The user-controlled resource may include a GPS resource, a camera resource, a video resource, an Internet connection resource, a music resource, an email resource, or any other resource that relates to user-private data. Permission to access such a user-controlled resource may be granted to specific applications directly by the user. In an embodiment, the requester application may send the message requesting access to the user-controlled resource to the deputy application instead of the computing system via the system API because the requester application does not have permission to access the resource.

In various embodiments, if a user is interacting with the deputy application when the message requesting access to the user-controlled resource is received from the requester application, a new instance of the deputy application may be created. This may prevent an ensuing privilege reduction caused by the interaction with the requester application from interfering with the user's experience. In this scenario, the instance of the application with which the user is interacting may be designated as the primary instance, while the new instance of the application may handle the message from the requester application. Moreover, if the deputy application receives messages from multiple requester applications, any number of additional instances of the application may be created and used to handle each message separately. In embodiments, multiple instances of an application may run concurrently and may be isolated from one another.

In embodiments, some applications may not be able to exist in duplicate. For example, long-running background applications may have states that cannot be replicated across multiple instances. Therefore, such an application may be designated as a singleton. For singleton applications, multiple communication events may be dispatched to the same instance. Consequently, a singleton application's permissions may be repeatedly reduced upon the delivery of each communication event.

At block 404, a first permissions list of the deputy application may be reduced to a second permissions list upon the acceptance of the message from the requester application. While the deputy application may have permission to access the particular user-controlled resource according to the first permissions list, the deputy application's permission may be revoked according to the second permissions list. The second permissions list may include the permissions from the first permissions list that are also possessed by the requester application. In other words, the second permissions list may be an intersection between the first permissions list of the deputy application and a permissions list of the requester application. Moreover, the first permissions list of the deputy application may not be increased, except in direct response to user input.

At block 406, the message may be sent from the deputy application to the computing system via the system API. However, due to the reduction of the first permissions list to the second permissions list, the deputy application may no longer have permission to access the user-controlled resource. Thus, the computing system may deny the deputy application's API call. In this manner, the requester application may be blocked from fraudulently gaining access to the user-controlled resource through the deputy application.

The method 400 is not intended to indicate that the steps of the method 400 are to be executed in any particular order or that all of the steps are to be included in every case. Further, steps may be added to the method 400 according to the specific application. For example, a second requester application may also send a message requesting access to a particular user-controlled resource to the deputy application. In this case, the second permissions list of the deputy application may be further reduced to a third permissions list. The third permissions list may include the permissions which are mutually possessed by the deputy application and both requester applications. Any number of additional requester applications may also send messages to the deputy application, and the deputy application's permissions list may be reduced accordingly.

In embodiments, the method 400 may function independently of the specific programming language which is utilized for each application. Moreover, the method 400 may also function independently of the runtime. This may be beneficial because many platforms support applications that are written in multiple different programming languages and that run on different runtimes. The method 400 may also be dynamic, meaning that the method 400 may function properly during runtime and may not depend on client-side application analysis. Further, the implementation of the method 400 may be independent of the application developer, since developer diligence in terms of security is not anticipated.

In embodiments, the specific functioning of the method 400 may depend on whether the particular system utilizes time-of-use permissions or install-time permissions for applications. For time-of-use permissions, the user may be prompted to approve or deny permission to access a user-controlled resource when a privileged API call is made. The user may then grant permission to access the user-controlled resource permanently, for a certain period of time, or for a single use. For install-time permissions, on the other hand, an application may declare its desired permissions in a manifest file at the time of installation. In order for the application to be properly installed, the user is prompted to grant the permissions requested by the application. In this case, new permissions may not be installed during runtime.

With regard to the method 400, time-of-use permissions are the simpler case. For systems which utilize time-of-use permissions, the user may be prompted whenever permission re-delegation is detected. The user may then choose to allow or deny the permission re-delegation according to each specific case. However, for systems which utilize install-time permissions, the situation is more complex. Each specific application may request all permissions used by the deputy applications with which the application may interact at the time of installation. This may lead to problems, however, because each application may have a very large number of permissions. Moreover, it may be hard to predict exactly which deputy applications may interact with a specific application. Therefore, this issue may be resolved by prompting the user to grant or deny the requester application temporary access to a particular privilege via a deputy application when permission re-delegation is detected.

In embodiments, the permissions lists utilized according to the method 400 may be governed by a number of access rights rules. For example, let A→B indicate that an application A sends a message, or access request, to an application B, and let $P^t(A)$ denote the set of permissions held by application A at time t. The first access rights rule may then be expressed as follows:

$$P^0(A) = P^{Original}(A).$$

In other words, the set of permissions held by application A at time zero is equal to the original set of permissions granted to application A by the user. For A→B at time t, the second access rights rule may be expressed as follows:

$$P^t(B) = P^{t-1}(B) \cap P^{t-1}(A),$$

where ∩ denotes an intersection function. In this case, for example, the intersection function may find the overlap between the set of permissions granted to application A and the set of permissions granted to application B. This means that, if application B receives a message from application A, its permissions are reduced to the intersection of the permissions of application B and application A. This is discussed further with respect to FIG. 5.

Figure 5:
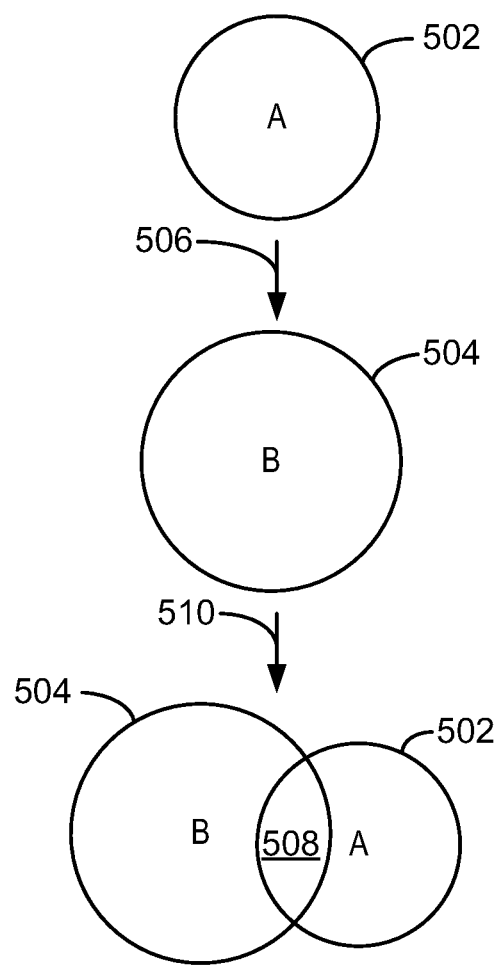
FIG. 5 is a schematic illustrating the general application privilege reduction effects of the IPC inspection procedure.

FIG. 5 is a schematic 500 illustrating the general application privilege reduction effects of the IPC inspection procedure. A requester application A with a set of permissions 502 may send a message to a deputy application B with a set of permissions 504, as indicated by the arrow 506. Because the set of permissions 502 of the requester application A differs from and is more limited than the set of permissions 504 of the deputy application B, the set of permissions 504 of the deputy application B may be reduced to the smaller set of permissions 508, as indicated by the arrow 510. As shown in FIG. 5, the smaller set of permissions 508 is equal to the intersection between the set of permissions 502 of the requester application A and the set of permissions 504 of the deputy application B. Moreover, in some embodiments, the set of permissions 502 of the requester application A may remain unchanged, since the requester application A has been granted a more limited set of permissions than the deputy application B. Further, in some embodiments, the set of permissions 502 of the requester application A may be included entirely within the smaller set of permissions 508 of the deputy application B. This may be the case if the deputy application B has been granted all of the permissions that have been granted to the requester application A by the user.

Figure 6:
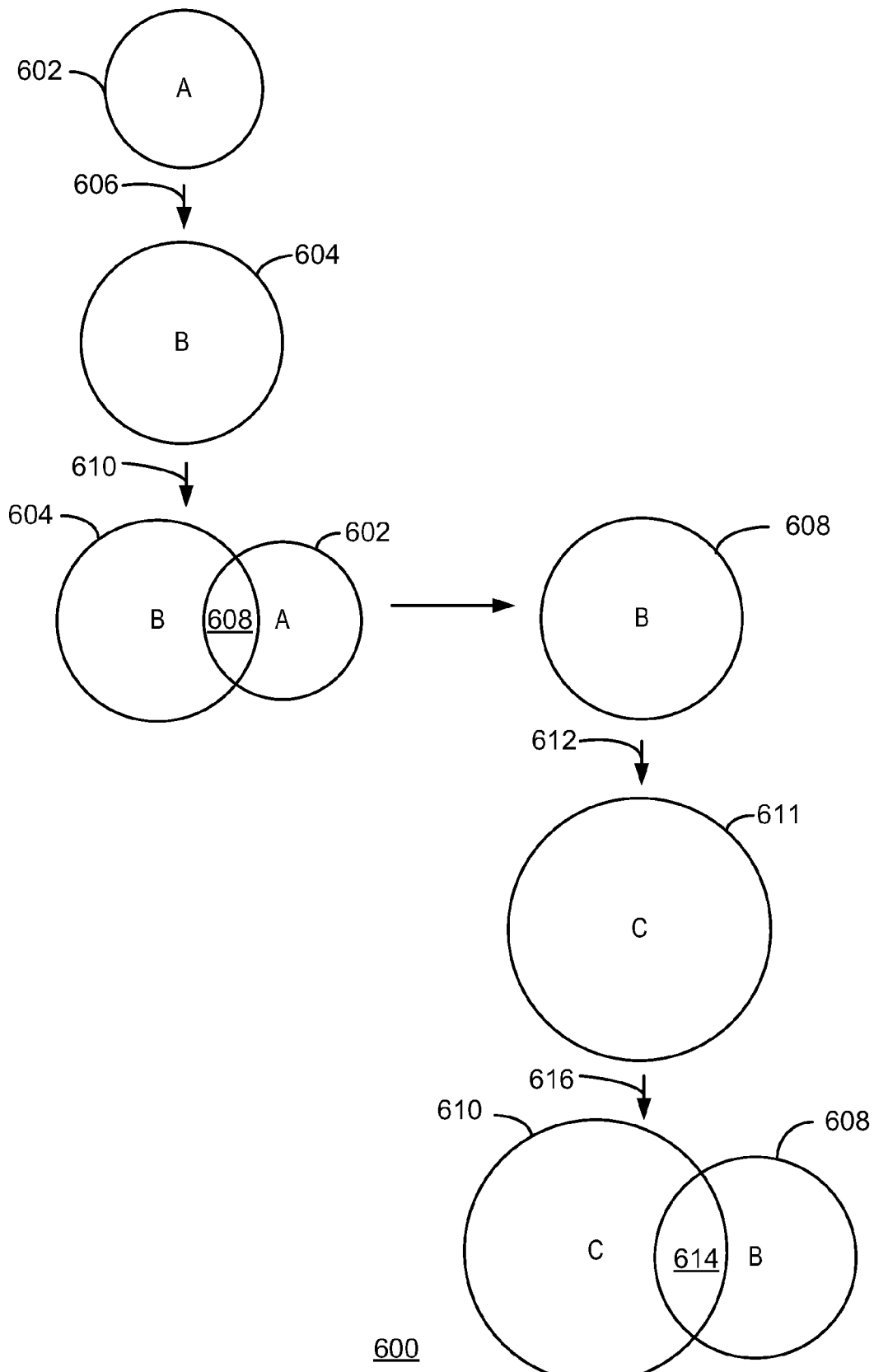
FIG. 6 is a schematic illustrating the transitive nature of the application privilege reduction effects of the IPC inspection procedure.

FIG. 6 is a schematic 600 illustrating the transitive nature of the application privilege reduction effects of the IPC inspection procedure. A requester application A with a set of permissions 602 may send a message to a deputy application B with a set of permissions 604, as indicated by the arrow 606. For the same reasons as those discussed with respect to FIG. 5, the set of permissions 604 of the deputy application B may be reduced to the smaller set of permissions 608, as indicated by the arrow 610. As shown in FIG. 6, the smaller set of permissions 608 is equal to the intersection between the set of permissions 602 of the requester application A and the set of permissions 604 of the deputy application B.

The chain of communication may then continue with the deputy application B acting as a requester application B. The requester application B with the set of permissions 608 may send a message to a deputy application C with a set of permissions 611, as indicated by the arrow 612. Because the set of permissions 608 of the requester application B may be smaller and more limited than the set of permissions 611 of the deputy application C, the set of permissions 611 of the deputy application C may be reduced to the smaller set of permissions 614, as indicated by the arrow 616. The smaller set of permissions 614 may be equal to the intersection between the set of permissions 608 of the requester application B and the set of permissions 611 of the deputy application C. Moreover, the smaller set of permissions 614 may also reflect the set of permissions 602 of the original requester application A. In this manner, all of the applications within a particular chain of communication may be taken into account for the determination of the appropriate set of permissions 614 for the deputy application C.

In embodiments, if A→B at time t, and B→C at time t+1, then the access rights rule relating to the schematic 600 may be expressed as follows:

$$P^{t+1}(C) = P^{t-1}(A) \cap P^{t-1}(B) \cap P^t(C).$$

This means that the set of permissions 614 of the deputy application C reflects the sets of permissions 602 and 608 of both the requester application A and the requester application B, respectively. In other words, an application's current permissions reflect the permissions of all the applications in a chain of communication, as discussed above.

Figure 7:
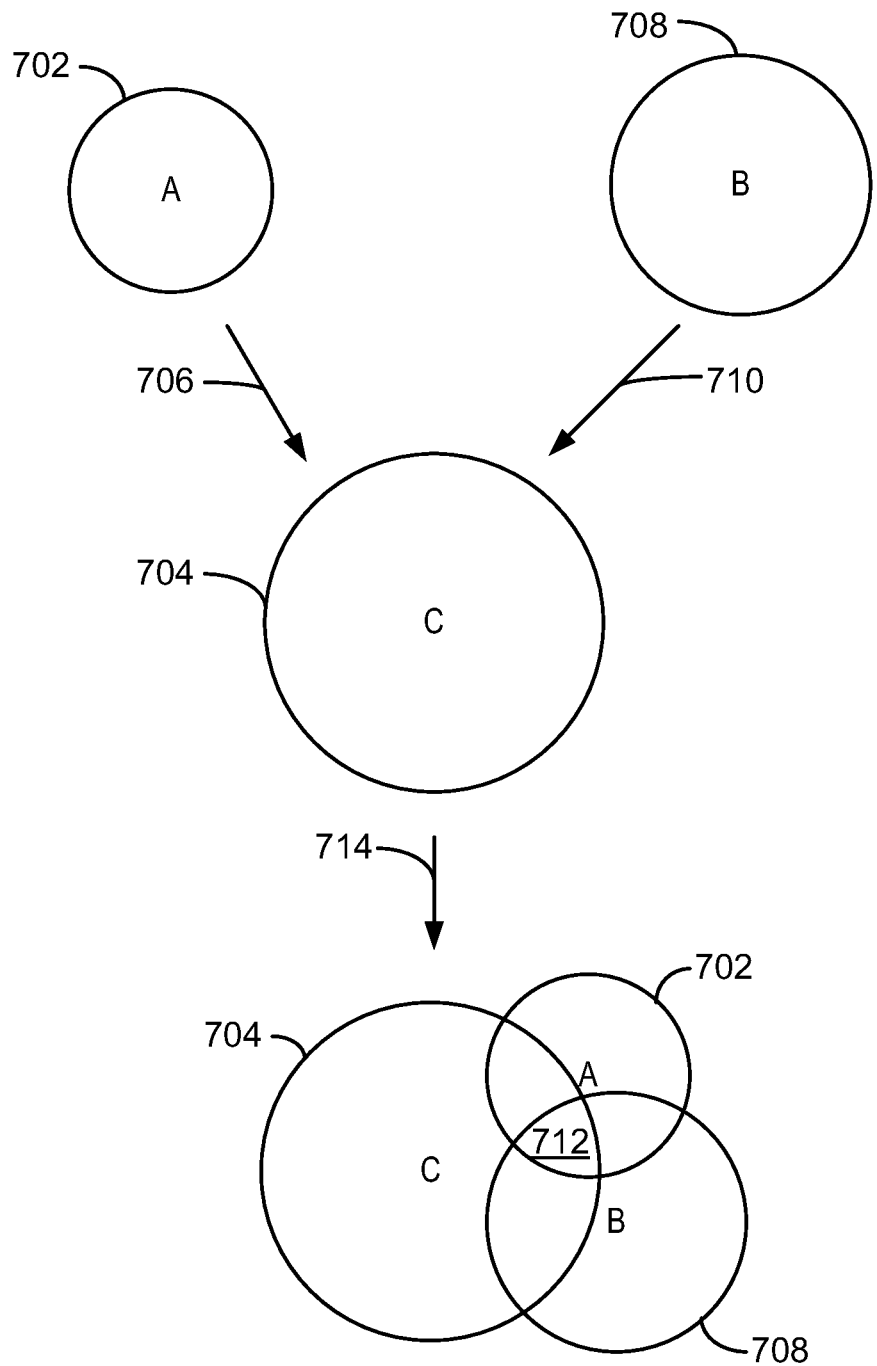
FIG. 7 is a schematic illustrating the additive nature of the application privilege reduction effects of the IPC inspection procedure.

FIG. 7 is a schematic 700 illustrating the additive nature of the application privilege reduction effects of the IPC inspection procedure. A requester application A with a set of permissions 702 may send a message to a deputy application C with a set of permissions 704, as indicated by the arrow 706. In addition, another requester application B with a set of permissions 708 may also send a message to the deputy application C, as indicated by the arrow 710. In embodiments, the messages to the deputy application C from the requester applications A and B may occur simultaneously or at separate times.

Because the requester applications A and B have smaller and more limited sets of permissions 702 and 708, respectively, than the set of permissions 704 of the deputy application C, the set of permissions 704 of the deputy application C may be reduced to the smaller set of permissions 712, as indicated by the arrow 714. As shown in FIG. 7, the smaller set of permissions 712 is equal to the intersection between the sets of permissions 702 and 708 of the requester applications A and B, respectively, and the set of permissions 704 of the deputy application C. Therefore, the acceptance of messages from multiple applications with varying degrees of permissions may have an additive effect. In embodiments, the general access rights rule relating to this additive effect may be expressed as follows:

$$P^t(C) = P^0(C) \cap \bigcap_{i=1}^{t-1} P^i(R_i),$$

where $R_i$ is a particular requester application, and $R_i \rightarrow D$ for each time i. This means that, if a deputy application receives messages from multiple requester applications, the set of permissions of the deputy application may be repeatedly reduced. In embodiments, this may be the case if the deputy application is a singleton application. Moreover, an original set of permissions of a deputy application may not be increased, except upon request by a user. This access rights rule may be expressed as follows:

$$P^i(A) \subseteq P^0(A), \forall i.$$

This means that there is no mechanism for increasing an application's permissions, other than direct user input. Moreover, in some embodiments, a reduced set of permissions of a deputy application may be restored to the application's original set of permissions once all requester applications within the chain of communication have been closed. However, the deputy application's set of permissions may not exceed the original set of permissions granted by the user.

In some embodiments, the basic access rights rules discussed above with respect to FIGS. 4-7 may apply to simplex, or unidirectional, inter-application communication. In simplex communication, the requester application may send a message to a deputy application, and the deputy application may take an action after receiving the message. In other embodiments, the basic access rights rules discussed above with respect to FIGS. 4-7 may also apply to request-reply inter-application communication. In request-reply inter-application communication, the recipient of a message, i.e., the deputy application, may return a value to the sender of the message, i.e., the requester application. The value may include, for example, the result of the communication between the applications or the result of an API call. Moreover, in request-reply inter-application communication, the requester application's permissions may not be reduced when a reply is delivered from the deputy application.

Moreover, in various embodiments, the permissions discussed above with respect to the method and system disclosed herein may include any of a number of different types of permissions. For example, the permissions may include hierarchal permissions, temporal permissions, or monetary permissions, among others. Hierarchal permissions may specify a status of an application relative to other applications in terms of a degree of permissions granted to the particular application. Temporal permissions may specify a certain length of time or particular time period during which an application may access particular resources within a computing system. Monetary permissions may specify a particular number of times that an application may access particular resources based on an amount of money paid for the access permission, for example.

Figure 8:
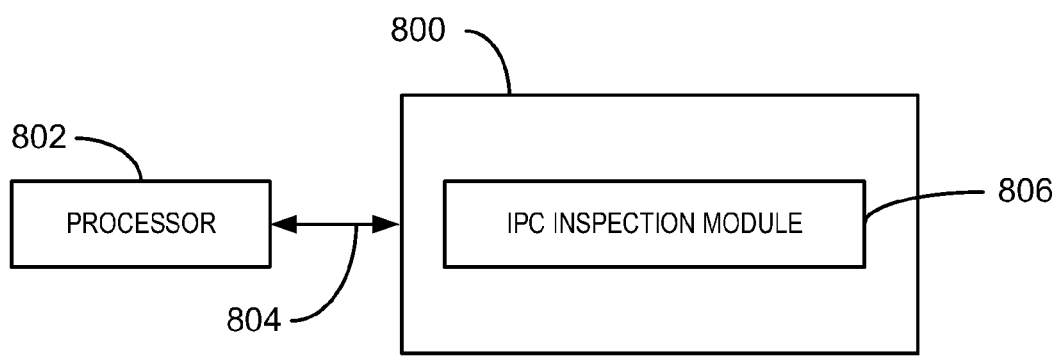
FIG. 8 is a block diagram showing a tangible, computer-readable medium that stores code adapted to prevent permission re-delegation among applications through IPC inspection.

FIG. 8 is a block diagram showing a tangible, computer-readable medium 800 that stores code adapted to prevent permission re-delegation among applications through IPC inspection. The tangible, computer-readable medium 800 may be accessed by a processor 802 over a computer bus 804. Furthermore, the tangible, computer-readable medium 800 may include code configured to direct the processor 802 to perform the steps of the current method. The various software components discussed herein may be stored on the tangible, computer-readable medium 800, as indicated in FIG. 8. For example, an IPC inspection module 806 may be configured to prevent permission re-delegation among applications in order to protect user-controlled resources. Further, the tangible, computer-readable medium 800 may also include any number of additional software components not shown in FIG. 8.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for preventing permission re-delegation among applications, comprising:
   accepting a message requesting access to a user-controlled resource from a requester application at a deputy application;
   reducing a first permissions list of the deputy application to a second permissions list, wherein the second permissions list comprises an overlap of permissions between the deputy application and the requester application;
   sending the message from the deputy application to a computing system via an application programming interface (API), wherein the computing system is configured to reject the message if the second permissions list of the deputy application does not permit access to the user-controlled resource; and
   rejecting a second message requesting access to the user-controlled resource if a third permissions list comprising an overlap of the second permissions list and a permissions list of a second requester application does not permit access to the user-controlled resource.

2. The method of claim 1, comprising rejecting the message requesting access to the user-controlled resource from the requester application at the deputy application.

3. The method of claim 1, comprising accepting the message requesting access to the user-controlled resource from the requester application at the deputy application if the requester application is registered on a list of acceptable requester applications.

4. The method of claim 1, wherein the computing system is configured to accept the message if the second permissions list of the deputy application permits access to the user-controlled resource.

5. The method of claim 1, comprising:
   accepting the second message requesting access to the user-controlled resource;
   reducing the second permissions list of the deputy application to the third permissions list; and
   sending the second message from the deputy application to the computing system via the application programming interface (API).

6. The method of claim 5, wherein the computing system is configured to accept the second message if the third permissions list of the deputy application permits access to the user-controlled resource.

7. The method of claim 1, wherein reducing the first permissions list of the deputy application to the second permissions list comprises calculating an intersection of the first permissions list of the deputy application and a permissions list of the requester application.

8. The method of claim 1, wherein accepting the message requesting access to the user-controlled resource from the requester application at the deputy application comprises creating a new instance of the deputy application if a user is interacting with the deputy application.

9. The method of claim 1, wherein increasing the first permissions list of the deputy application is prohibited unless directed by a user.

10. The method of claim 1, comprising accepting the second message if the third permissions list permits access to the user-controlled resource.

11. A computing device for permission re-delegation prevention, comprising:
    a processor; and
    a system memory, comprising a requester application configured to notify a deputy application of a request to access a user-controlled resource, wherein the requester application comprises fewer permissions than the deputy application;
    the deputy application configured to:
       reduce a first list of permissions to produce a second list of permissions, wherein the second list of permissions comprises an overlap of shared permissions between the deputy application and the requester application; and
       send the request to a computing system via an application programming interface (API); and
    the computing system configured to:
       reject the request if the second permissions list does not permit access to the user-controlled resource; and
       reject a second message requesting access to the user-controlled resource if a third permissions list comprising an overlap of the second permissions list and a permissions list of a second requester application, does not permit access to the user-controlled resource.

12. The computing device of claim 11, wherein the user-controlled resource comprises a camera resource, a global positioning system (GPS) resource, an email resource, a music resource, or an Internet connection resource, or any combinations thereof.

13. The computing device of claim 11, wherein permissions comprise hierarchal permissions, temporal permissions, or monetary permissions, or any combinations thereof.

14. The computing device of claim 11, comprising an inter-application communication (IPC) mechanism between the deputy application and the requester application.

15. The computing device of claim 11, wherein the deputy application is configured to accept the request from the requester application if the requester application comprises one of a plurality of acceptable requester applications.

16. One or more non-volatile computer-readable storage media for storing computer readable instructions, the computer-readable instructions providing an inter-application communication (IPC) inspection system when executed by one or more processing devices, the computer-readable instructions comprising code configured to:

accept a message requesting access to a user-controlled resource from a requester application at a deputy application;

reduce a first permissions list of the deputy application to a second permissions list, wherein the second permissions list comprises an intersection of permissions between the deputy application and the requester application;

send the message from the deputy application to a computing system via a system API, wherein the computing system is configured to reject the message if the second permissions list of the deputy application does not permit access to the user-controlled resource; and reject a second message requesting access to the user-controlled resource if a third permissions list comprising an overlap of the second permissions list and a permissions list of a second requester application, does not permit access to the user-controlled resource.

17. The one or more non-volatile computer-readable storage media of claim 16, wherein the IPC inspection system is configured to operate independently of a runtime.

18. The one or more non-volatile computer-readable storage media of claim 16, wherein the IPC inspection system is configured to operate independently of a utilized computer language.

19. The one or more non-volatile computer-readable storage media of claim 16, wherein the IPC inspection system is configured to function at an operating system (OS) level.

* * * * *